(12) United States Patent
Purri et al.

(10) Patent No.: US 9,922,209 B1
(45) Date of Patent: Mar. 20, 2018

(54) SECURITY DATA PATH VERIFICATION

(71) Applicant: Cadence Design Systems, Inc., San Jose, CA (US)

(72) Inventors: Victor Markus Purri, Austin, TX (US); Caio Araújo Teixeira Campos, Austin, TX (US); Magnus Björk, Göteborg (SE); Lawrence Loh, Milpitas, CA (US); Claudionor Jose Nunes Coelho, Menlo Park, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/269,919

(22) Filed: Sep. 19, 2016

Related U.S. Application Data

(62) Division of application No. 13/867,341, filed on Apr. 22, 2013, now Pat. No. 9,449,196.

(51) Int. Cl.
G06F 17/50 (2006.01)
G06F 11/22 (2006.01)
G06F 21/71 (2013.01)

(52) U.S. Cl.
CPC .......... G06F 21/71 (2013.01); G06F 17/5045 (2013.01)

(58) Field of Classification Search
CPC .................... G06F 17/5036; G06F 17/5022
USPC .................................................. 716/136
See application file for complete search history.

(56) References Cited

U.S. PATENT DOCUMENTS

| 5,696,694 A | 12/1997 | Khouja et al. |
| 5,801,958 A | 9/1998 | Dangelo et al. |
| 5,933,838 A | 8/1999 | Lomet |
| 6,012,152 A | 1/2000 | Douik et al. |
| 6,449,578 B1 | 9/2002 | McBride |
| 6,549,917 B1 | 4/2003 | Pollard et al. |
| 6,618,841 B1 | 9/2003 | Huang |
| 6,665,845 B1 | 12/2003 | Aingaran et al. |
| 6,691,301 B2 | 2/2004 | Bowen |
| 6,829,753 B2 | 12/2004 | Lee et al. |

(Continued)

FOREIGN PATENT DOCUMENTS

WO   WO 03/100704 A2   12/2003

OTHER PUBLICATIONS

Liu, Dongzi, et al., "Non-iterative Post Assembly Design Closure for Giga-Gate Designs," DesignCon 2011 (12 pages).

(Continued)

Primary Examiner — Suresh Memula
(74) Attorney, Agent, or Firm — Vista IP Law Group, LLP

(57) ABSTRACT

A formal verification approach verifies data access and data propagation paths in a circuit design by proving the unreachability of path cover properties of the circuit design. A security path verification system receives an original circuit model of a circuit design, along with parameters identifying a first location within the circuit design that is a source of tainted data and a second location within the circuit design that is coupled to the first location. The security path verification system also receives a selection of portions of the circuit design to be excluded from the verification analysis. Using an abstracted version of the exclude portions, the security verification system generates a second circuit model of the circuit design for use in determining whether the tainted data can reach the second location from the first location within the circuit design.

15 Claims, 7 Drawing Sheets

(56) References Cited

U.S. PATENT DOCUMENTS

| | | | |
|---|---|---|---|
| 6,836,877 | B1 | 12/2004 | Dupenloup |
| 6,917,909 | B1 | 7/2005 | Markov et al. |
| 6,934,921 | B1 | 8/2005 | Gu et al. |
| 7,175,940 | B2 | 2/2007 | Laidig et al. |
| 7,206,731 | B2 | 4/2007 | Sercu et al. |
| 7,421,668 | B1 | 9/2008 | Ip et al. |
| 7,890,897 | B2 | 2/2011 | Levitt et al. |
| 8,587,102 | B2 | 11/2013 | Leedy |
| 8,719,743 | B1 | 5/2014 | Kollaritsch et al. |
| 9,449,196 | B1 | 9/2016 | Purri et al. |
| 2003/0079192 | A1 | 4/2003 | Cheong et al. |
| 2003/0177463 | A1 | 9/2003 | Daga |
| 2004/0128641 | A1 | 7/2004 | Broberg, III et al. |
| 2004/0243373 | A1 | 12/2004 | Sercu et al. |
| 2005/0108667 | A1 | 5/2005 | Iadanza et al. |
| 2005/0114818 | A1 | 5/2005 | Khakzadi et al. |
| 2005/0204315 | A1 | 9/2005 | Knol et al. |
| 2005/0268269 | A1 | 12/2005 | Coiley |
| 2007/0101310 | A1 | 5/2007 | Stirniman et al. |
| 2007/0294655 | A1 | 12/2007 | Campos |
| 2008/0127015 | A1 | 5/2008 | Chandramouli et al. |
| 2008/0222581 | A1* | 9/2008 | Banerjee ............ G06F 17/5045 716/136 |
| 2008/0222589 | A1 | 9/2008 | Banerjee |
| 2011/0113392 | A1* | 5/2011 | Chakraborty ......... G06F 17/505 716/102 |
| 2013/0305194 | A1 | 11/2013 | Wang |

OTHER PUBLICATIONS

Adya, Saurabh, et al., "Consistent Placement of Marco-Blocks Using Floorplanning and Standard-Cell Pacement," University of Michigan, EECS Department, Copyright 2002 (6 pages).

Kern, Christoph, et al., "Formal Verification in Hardware Design: A Survey," ACM Transactions on Design Automation of Electronic Systems, vol. 4, No. 2, Apr. 1999 (71 pages).

Kanapka, Joe, et al., "Highly Accurate Fast Methods for Extraction and Sparsification of Substrate Coupling Based on Low-Rank Approximation," Copyright 2001 (7 pages).

Newton, Arthur, et al., "Relaxation-Based Electrical Simulation," IEEE Transactions on Electron Devices, vol. ED-30, No. 9, Sep. 1983 (24 pages).

"Synopsys FPGA Synthesis Synplify Pro for Actel Edition Reference," Apr. 2011 (1172 pages).

Bhargavan, Karthikeyan, et al., "Verified Interoperable Implementations of Security Protocols," ACM Transactions on Programming Languages and Systems, vol. 31, No. 1, Article 5, Dec. 2008 (61 pages).

Kouroussis, Dionysios, et al., "Incremental Partitioning-Based Vectorless Power Grid Verification," IEEE, Copyright 2005 (7 pages).

Gielen, Georges, et al., "Performance Space Modeling for Hierarchical Synthesis of Analog Integrated Circuits," DAC, Copyright 2005 (6 pages).

"Fire & Ice QXC User Guide," Aug. 2005 (154 pages).

"Computing Curricula 2001 Computer Science: Final Report," Dec. 15, 2011 (240 pages).

Phillips, Joel, "Variational Interconnect Analysis via PMTBR," IEEE, Copyright 2004 (8 pages).

Kahng, Andrew, et al., "Min-Max Placement for Large-Scale Timing Optimization," ISPD, Copyright 2002 (6 pages).

U.S. Appl. No. 14/876,141, filed Oct. 6, 2015 (not enclosed).

U.S. Appl. No. 14/754,331, filed Jun. 29, 2015 (not enclosed).

Notice of Allowance dated May 20, 2016 for U.S. Appl. No. 13/867,341.

Non-Final Office Action dated Feb. 4, 2016 for U.S. Appl. No. 13/867,341.

Non-Final Office Action dated Jul. 14, 2017 for U.S. Appl. No. 15/269,931.

\* cited by examiner

SECURITY DATA PATH VERIFICATION

CROSS REFERENCE TO RELATED U.S. PATENT APPLICATION(S)

This application is a division of U.S. patent application Ser. No. 13/867,341, now U.S. Pat. No. 9,449,196, filed on Apr. 22, 2013 and entitled "SECURITY DATA PATH VERIFICATION". This application is related to U.S. patent application Ser. No. 15/269,931 and entitled "SECURITY DATA PATH VERIFICATION". The contents of the aforementioned U.S. patent applications are hereby expressly incorporated by reference in their entireties for all purposes.

BACKGROUND

This present disclosure relates generally to formal verification of circuit designs, and more particularly to formal verification methods of verifying data access and data propagation paths in multi-system circuits.

Devices such as mobile phones, gaming consoles, and set top boxes often include multiple computing devices that store, share, or otherwise access sensitive data. For example, sensitive data, such as encryption and decryption keys, may be designed to be read from secure locations within a computing device and sent to other secure functional components through secure channels within the device. Handling of sensitive data has related security requirements, which generally specify that (1) secure data and control information should not reach non-secure areas of the computing device and (2) non-secure data and control information should not propagate to secure areas of the computing device or interfere with secure operations performed by the computing device. The role of initiators (e.g., masters) and receivers (e.g., slaves) regarding one or a combination of data and control information are important when analyzing these requirements. Analysis regarding whether secure data and control information has passed through an encryption path or not is also important.

Overall, the process of integrating multiple intellectual property (IP) functional components to create multi-system circuits sometimes provides an unexpected path to secure areas of the computing device. The addition of test logic and associated test ports may create a path by which secure data may be accessed by an interface external to the computing device. The resulting path may create a security leak (i.e. violation to requirement 1 above) or an illegal modification or interference on a secure area (i.e. violation to requirement 2 above). Current techniques used to verify that a design is free from data security leaks or unintentional pathways creating unauthorized data access are insufficient.

SUMMARY

Embodiments include a formal verification approach for verifying data access and data propagation paths in multi-system circuits by proving the unreachability of path cover properties of the circuit design. In one embodiment, a security path verification system receives an original circuit model of a circuit design. As used herein, the term "circuit model" may refer to a model of an entire circuit or any portion of a circuit. The security path verification system also receives parameters identifying a first location within the circuit design that is a source of tainted data and a second location within the circuit design that is coupled to the first location. To tune or optimize the formal verification process, the security path verification system may receive a selection of portions of the circuit design that include logic to be excluded from the verification analysis. Logic to be excluded is received by the security path verification system as an indication of a portion of the circuit design to be modeled as a black box, where the indicated portion is located along one more transmission paths between the first and second locations within the circuit design. Traditional analysis excludes the logic in the blackboxed module from the analysis and allows any arbitrary values at the outputs of such module. But to ensure that tainted data may still propagate through the excluded logic, the security path verification system replaces the excluded logic with a connectivity abstraction, intended to maintain the data propagation properties of the excluded logic. Traditional handling of blackboxed modules in formal verification of generic properties, in contrast, merely allows any arbitrary value to propagate to the outputs of the blackboxed module. The disclosed embodiments, however, use a functional representation of the blackboxed module, with not as much details as the actual circuit description of the module, but with details sufficient for security verification. The connectivity abstraction may be generated in netlist form or other appropriate representation. Using the connectivity abstraction, the security verification system generates a second circuit model of the circuit design by modifying the first circuit model with the abstracted version of the excluded portion of the circuit design. Using the second circuit model, the security verification system determines whether the tainted data can reach the second location within the circuit design from the first location within the circuit design. In one embodiment, formal verification may be used to verify whether the tainted data can reach the second location within the circuit design from the first location within the circuit design. By using a modified circuit model that includes the connectivity abstraction, the security verification system provides a tunable analysis environment that allows the propagation of tainted data. Furthermore, the security verification may involve restricting the analysis to only consider paths that go through or do not go through the specified signal paths. Accordingly, the disclosed embodiments yield verification results with a measurable level of completeness compared to other security path verification techniques.

For example, some security path verification techniques use structural analysis, which requires a user to manually trace of a path to verify the presence of a blocking agent. Such an approach is often impractical because of the tedious process of analyzing a very large number of potential paths. Moreover, structural analysis is often subjective, lacking a clear checking mechanism. Other security data path verification techniques use dynamic simulation methods, where user would generate different stimulus on the inputs of the system, simulating attacks done by a hacker. Yet, using this approach not all possible attacks can be covered by the engineer in reasonable time. Moreover, simulation tools currently available do not reliably detect if security requirements have been violated. These deficiencies increase the likelihood that security-related issues will not be discovered during the design/verification phase. And like structural analysis techniques, dynamic simulation methods also fail to yield to verification results with a measurable level of completeness.

DETAILED DESCRIPTION

Overview

To identify unintentional functional paths to and from secure areas of a circuit design, embodiments of the present disclosure leverage the idea of a path cover property, defined by a source signal, destination signal, and optional extensions. In one embodiment, a computer-implemented method for circuit design verification comprises performing security verification on a circuit design by proving the unreachability of path cover properties of the circuit design. Each path cover property being proven will capture one specific pair of source location and destination location, such that tainted data or control information propagation from the source to the destination should not occur in the circuit design. Proving a cover property is unreachable suggests that data on the source signal never reaches the destination signal under a specified set of constraints.

The analysis of data propagation between source and destination locations in a circuit design uses a technique of injecting a special data tag called "taint" on data or control information generated at the source and checking if taint appears on data or control information arriving at the destination. In some cases, the data may have been transformed during the transportation from the source to the destination, but it remains to be tagged as tainted. Depending the intent of the verification, the 'tainted' data can represent secured data/control information that is not supposed to reach unsecured area, or it can represent unsecured data/control information that is not supposed to reach secured area or interfere with secure operations. Depending on the security requirements for the specific circuit design, the data may become untainted if it passes through a specific part of the design, such as an encryption module.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Security Verification System Target

Figure 1:
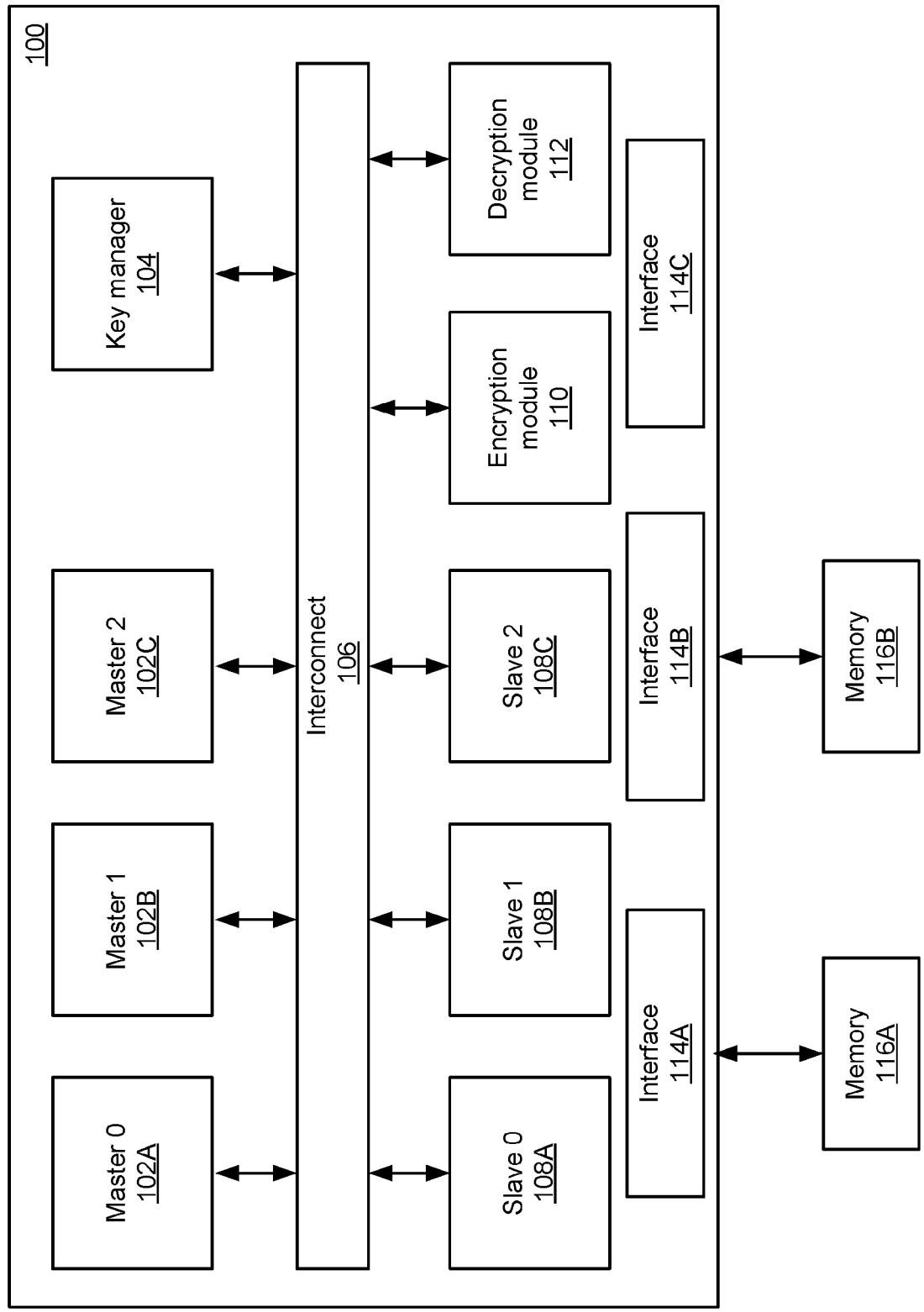
FIG. 1 illustrates a block diagram of a computing device to be tested for security violations in accordance with an embodiment.

FIG. 1 illustrates a block diagram of a computing device 100 to be tested for security violations of a circuit design within the computing device 100 in accordance with an embodiment. The computing device 100 may be a multi-system system-on-chip (SoC) that includes one or more master devices 102A-C, key manager 104 coupled to one or more slave devices 108A-C, encryption module 110 and decryption module 112, through interconnect 106. The master devices 102A-C, for example, may be a processing module, such as a CPU. In another example, the key manager 104 may be also a master device configured to read one or a combination of encryption and decryption keys from the memory 116A or the memory 116B using interfaces 114A and 114B. For example, the memory 116A may be read only memory (ROM) and interface 114A may be a secured interface, such that access to the interface 114A may be restricted. In another example the memory 116B may be a random access memory (RAM) and the interface 114B may be an unsecured interface.

The computing device 100 may also include slave devices 108A-108C configured to execute operations responsive to one or a combination of data and control information received from the master devices 102A-C or key manager 104. In one example, a slave device 108 may be configured to perform a specific operation, such as encryption module 110 or decryption module 112. In another example, a slave device 108 may also include an interface, such as interface 114A or 114B, coupled to a memory 116A-116B, or other type of interface configured to transmit and receive data. For example, interface 114A may be a secured interface, such that access to the interface 114A may be restricted. In another example the memory 116B may be a random access memory (RAM) and the interface 114B may be an unsecured interface.

The computing device 100 may also include other interfaces 114C configured to support various networking, storage, audio, video, test, and other interface protocols. In other embodiments, the computing device 100 may include greater than or less than the number of interfaces 114A-C shown in FIG. 1. Furthermore, although not shown, the computing device 100 includes other circuits and data paths that connect the master devices 102A-C and slave devices 108A-C to the interfaces 114A-C.

The memory 116A-116B may be any suitable storage medium, including read-only memory (ROM), random access memory (RAM), or other suitable volatile or non-volatile storage medium. The memory 116A-116B may be external to the computing device 100 or embedded memory located on the same die or within the same device package as one or more of the master 102A-C or slave devices 108A-C.

Security Verification System

Figure 2:
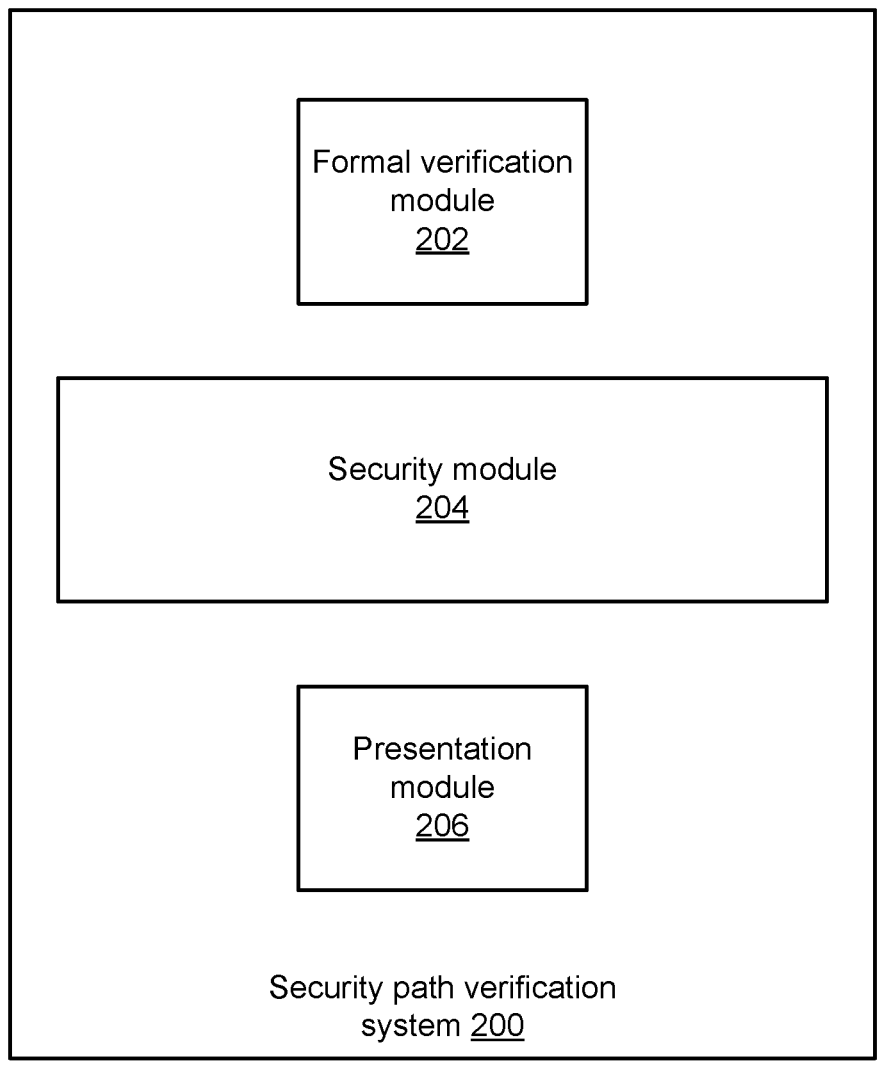
FIG. 2 illustrates a block diagram of a security path verification system for performing security verification of a circuit design in accordance with an embodiment.

FIG. 2 is security path verification system 200 for performing security verification of a circuit design, according to an embodiment. As shown, security path verification system 200 includes a formal verification module 202, a security module 204, and a presentation module 206. In one embodiment, the security path verification system 200 may be a computer comprised of one or more processors, and the modules are processor executable software instructions stored on a non-transitory computer readable medium of the computer.

The formal verification module 202 performs a formal verification of a circuit design using a set of properties and a set of signal constraints. Formal verification uses mathematical techniques to either prove that, under a set of constraints, each property in the set of properties is always correct or to provide an example condition (called a counterexample) that demonstrates the property is false. The counterexample can be a trace of signal inputs that cause the property to be false. One type of property is a cover property, such as a temporal expression defined in a property language, using industry standards, SystemVerilog assertion or PSL. Formal verification can also be used to prove whether it is possible for the cover property to be reached or not.

In one embodiment, the formal verification module 202 accesses a register transfer level (RTL) description of the circuit design corresponding the computing device 100, which may be written in a hardware description language (HDL) or other appropriate language. The formal verification module 202 converts the RTL description into a format that is appropriate for formal verification. In one embodiment, the set of properties to be proven during formal verification may be embedded in the RTL description or stored in a file that is separate from the RTL description. The properties may also described in an assertion based verification language, such as System Verilog Assertion (SVA) or Property Specification Language (PSL).

The security module 202 verifies whether a cover path property, describing a path through the computing device 100, can be reached. The security module 202 receives security parameters that specify which resources in the computing device 100 are visible and/or accessible by agents in the computing device 100 for a specific configuration. For example, security parameters may describe the following security requirements:
1) No security leak: Secure data/control should never reach non-secure areas
   1.1) Keys should never reach master_0 102A/master_1 102B without going through encryption module 110
   1.2) Secure control information in Key Manager 104 should never reach master_0 102A
2) No illegal modification or interference to the security operation: Non-secure data/control should never reach secure areas
   2.1) Data in secure storage of Encryption module 110 and Decryption module 112 should never be affected by master_0 102A/master_1 102B
   2.2) Data in secure storage of Encryption module 110 and Decryption module 112 should not come from non-secure ROM locations
   2.3) Control information in secure storage Encryption module 110 and Decryption module 112 should never be affected by master_0 102A/master_1 102B The security parameters may also specify functional blocks or portions of the computing device 100 to be excluded from the security verification process and paths within the computing device 100 to ignore or to include as described in further detail with reference to FIG. 3. In one embodiment, the security module 204 generates a connectivity abstraction that represents the portions of the computing device selected to be excluded from the security verification process. A connectivity abstraction describes how data may be passed through this module, capturing the possible propagation paths and latencies between the inputs and outputs of such blackboxed module. The security module 204 substitutes the connectivity abstraction for the portions of the computing device 100 that they represent. The security module 204 then determines if the security parameter includes "through" or "not-through" options. If such parameters are present, the security module 204 performs further modification to the computing device 100. When all modifications to the computing device 100 have been performed, the formal verification module 202 tests the security requirements against the modified description of the computing device 100. The security requirements can be input to the formal verification module 202 as one or more path cover properties. Using the security requirements, the formal verification module 202 performs a path cover analysis that generates an indication of whether the path cover property can be reached.

The presentation module 206 presents information in a display so that the propagation of data from the source to the destination can be viewed by a user. When a path cover property is satisfied, the presentation module 206 generates a waveform that show how tainted data generated at the source reaches the destination for some operating condition of the computing device 100. Alternatively, the presentation module 206 generates a message that indicates that a path cover property is unreachable (i.e., it is not possible to for data to propagate from the source to the destination).

Figure 3:
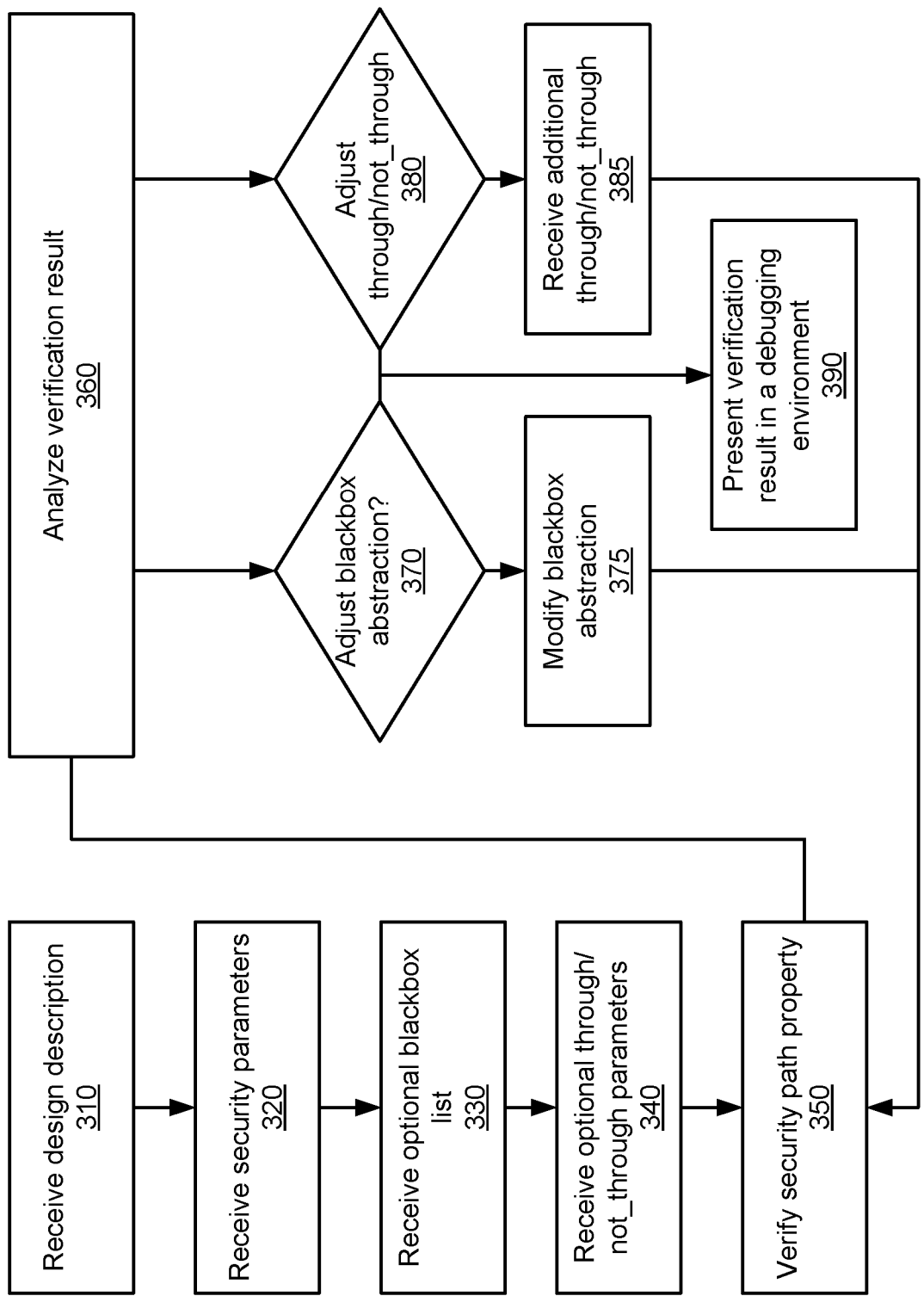
FIG. 3 illustrates a flowchart of a method for verifying a security property in accordance with an embodiment.

FIG. 3 illustrates a flowchart of a method for verifying a security property in accordance with an embodiment. The steps do not necessarily need to be executed in the specific order in the flow chart, and many of the steps are optional. The formal verification module 202, security module 204, and presentation module 206 from FIG. 2 are not explicitly marked in this flowchart, but they could be used as part of steps 310-390.

In step 310, the circuit design description is received. For example, the security verification system 200 may receive verification IP, RTL representation of the computing device 100 under test, along with other common verification environment setup information. The formal verification environment, which may include a transaction definition, may be previously instantiated into the RTL prior to receipt by the formal verification tool.

In step 320, the security parameters are received. The security parameters may be specified by a user that is familiar with the aspects of the computing device 100 that should be tested. Using the security parameters, a user may specify checks to be performed on a portion of the circuit design included in the computing device 100. Generally, the checks look for a security leak or an illegal modification or interference to the security operations.

A security leak occurs when secure data or control information is exposed to an unsecure or otherwise unintended destination. For example, returning to FIG. 2 and FIG. 3, the circuit design of the computing device 100 may include an external memory 116A, an external secure ROM 116B, two processing modules 102A and 102B, and other function elements. In operation, the encryption 110 and decryption 112 modules receive cryptographic keys from the key manager 104 (a master device) and encrypt or decrypt data written to memory locations accessible by the key manager 104. The key manager 104 reads the cryptographic keys from the ROM 116B and transfers the cryptographic keys to the encryption module 110 or decryption module 112 after reset. A check to verify a security leak may be configured to verify the absence of an undesired leak of the cryptographic keys to other parts of the circuit design, such as processing module 102A or external memory 116A. Whereas a check to verify an illegal modification may be configured to verify that, for example, the cryptographic keys may be overwritten from unauthorized sources, such as processing modules 102A and 102B or external memory 116A.

Returning to FIG. 3, in one example, the security parameters are designed to verify that the cryptographic keys stored in ROM 116B never reach processing module 102A without passing through the encryption/decryption logic. The following check evaluates whether the ROM data at address KEY_ENC and KEY_DEC can ever traverse to the master 0 interface, signal "m0_cpu.M_rdata". The check may be received as a list of properties formatted as follows:

```
% check_spv -create \
    -from rom_data \
    -from_precond {rom_read && rom_addr=='KEY_ENC}\
    -to m0_cpu.M_rdata \
    -to_precond m0_cpu.M_req
% check_spv -create \
    -from rom_data \
    -from_precond {rom_read && rom_addr=='KEY_DEC}\
    -to m0_cpu.M_rdata \
    -to_precond m0_cpu.M_req
``` where the switches '-from' and '-to' indicate the endpoints of the path to be checked, and the switch '-from_precond' indicates that the analysis operates only on data leaving the '-from' signal when that precondition is met. The operation of this property is designed to check data read out of the ROM when the read address corresponds to a memory location where one of the cryptographic keys is stored. The switch '-to_precond' is the counterpart of '-from_precond' but now applied to the '-to' signal. The operation of this property is designed to check for data being exposed on the '-to' signal when the precondition is satisfied. In this case, the check is restricted to only check for tainted data coming from the ROM reaching master 0 if this master is requesting data.

In another example, the security parameters are designed to verify that the cryptographic keys should not come from unsecured memory locations. In this example, the ROM 116B comprises the encryption/decryption keys along with non-secure information, which is accessible by the processing modules 102A and 102B, for example. Thus, a check to verify that non-secure data is not unintentionally used as a cryptographic key may be performed. The following check evaluates whether only data read from ROM address can be written to KEY_ENC and KEY_DEC is true. The check may be received as a list of properties formatted as follows:

```
% check_spv -create \
    -from rom_data \
    -from_precond {rom_read && rom_addr !='KEY_ENC}\
    -to s1_encrypt.key_data
% check_spv -create \
    -from rom_data \
    -from_precond {rom_read && rom_addr !='KEY_DEC}\
    -to s2_decrypt.key_data
```

In step 330, the black box information is received. A detailed description of the black box will be described in reference to FIGS. 5A, 5B, 6A, and 6B. Generally, the black box information may specify the input, output, and transfer behavior of particular aspects of the computing device 100 that do not need extensive testing. In some configurations, the security path verification tool will ignore any path going through a black box. There are cases where such behavior is acceptable, depending on whether it is being verified that secure data never reaches the black-box interface. For example, such as case may be applicable for the processing modules 102A and 102B or where there exists a high likelihood that no paths pass through the portion of the circuit design corresponding to the black box.

In another configuration, a path to be checked may pass through a portion of the circuit corresponding to a black box. Accordingly, the security path verification tool considers paths going through the portion of the circuit design represented by the black box, even though the logic inside this portion of the circuit design under test is excluded from the analysis. The security path verification system 200, in turn, creates a connectivity abstraction to represent the excluded portion of the circuit design based on the received black box information. In one example, the received black box information may be formatted as follows:

```
% check_spv -abstract \
    -instance s4_io \
    -delay 0:$ \
    -ignore inputs {clk rstN}
``` where the switch '-instance' specifies the instance where to create the connectivity abstraction (here, instance s4_io), the switch '-delay' specifies how to instruct the security path verification to allow propagations taking 0 (combinational) to infinite clock cycles to occur, and the '-ignore inputs' instruct the security path verification tool to ignore the inputs 'clk' and 'rstN' when creating connectivity abstractions.

In step 340, through and not_through parameters are received. In one embodiment, through and not_through parameters cause the security path verification tool 200 to restrict the analysis to only consider paths that go through or do not go through the specified signal paths. In one example, through and not_through parameters may be received by the security path verification system 200 in the following format:

```
% check_spv -create \
    -from m2_key_mgr.secure_fsm \
    -to {m0_cpu.M_req m1_cpu. M_req}\
    -not_through {interconnect.M_req interconnect.M_ack}
``` where the switch 'not_through' causes the security path verification tool to ignore any signal path through signals "interconnect.M_req" and "interconnect.M_ack."

In step 350, the security parameters, black box abstraction information, and through/not_through parameters are used to formulate a formal verification problem to be passed to the formal verification module 202. The security path may be verified 510 using the formal verification module 202 by executing a cover -path command on the modified circuit. In one example, the cover -path command may have the following format:

cover -path -from A [-event <expr>][-through B][-not_through D][-to C]

This command generated by the security module 204 is processed by the formal verification module 202 on the modified circuit model (e.g., the original circuit netlist modified in accordance with one or a combination of security parameters, black box abstraction information, and through/not_through parameters), checking if tainted data injected at A can be propagated to C through or not-through B. In the following description of the analysis performed by the formal verification module, the symbol X represents tainted data. The event is a Boolean expression describing the state of the circuit model. If "A" is a primary input (or a cut point has been specified by the user to ignore its driving logic—known as "stopat"), and -event is not specified, "A"

is assigned the value "X," it means tainted data is always injected. If "A" is a primary input or stopat, and -event is specified, "X" will be injected at "A" ONLY if <expr> is valid. If "A" is an internal net of the design, and -event is not specified, the security path verification tool may issue an error. If "A" is an internal net of a portion of the circuit design under test, and -event is specified, "X" will be injected at "A" only if <expr> is valid. Here, '-through' means that any trace exercising the cover path property, i.e. a trace that propagates the "X" from "A" to "C" must have "B" in the transitive path. While '-not_through' means that any trace exercising the cover path property, i.e. a trace that propagates the "X" from "A" to "C", cannot have "D" in the transitive path. Transitive path is the path in which the data gets transferred from one location to another location in the circuit design. More details about this analysis will be described in FIG. 4.

In one embodiment, the formal verification module 202 returns the verification results in step 360 to the user using the presentation module 206, and receives guidance from the user regarding adjustment to the black box abstraction 370, through parameters, and not-through parameters 380. The black box abstraction 370 is usually refined if the verification results indicate current abstraction leads to a trace not possible in the original circuit design without the abstraction and without the black box. The not_through parameters are usually added if the resulting trace shows the tainted data flowing through a module that modifies the data to an untainted data and hence should be considered as not violating the security requirement. The through parameters are usually added if the user wants to steer the verification to focus on the specific module, such as due to verification performance reason. In step 375, the security module 204 may receive from the user modification to the black box abstraction and/or the through/not-through parameters as shown in step 385. The circuit model is modified accordingly and the security path property is re-verified 350.

In step 390, the presentation module 206 presents the final verification results, including the list of properties proven unreachable, such as inability of a tainted data to reach unsecure area, and a list of problematic areas, each with a trace illustrating how a tainted data may reach unsecure data.

Figure 4:
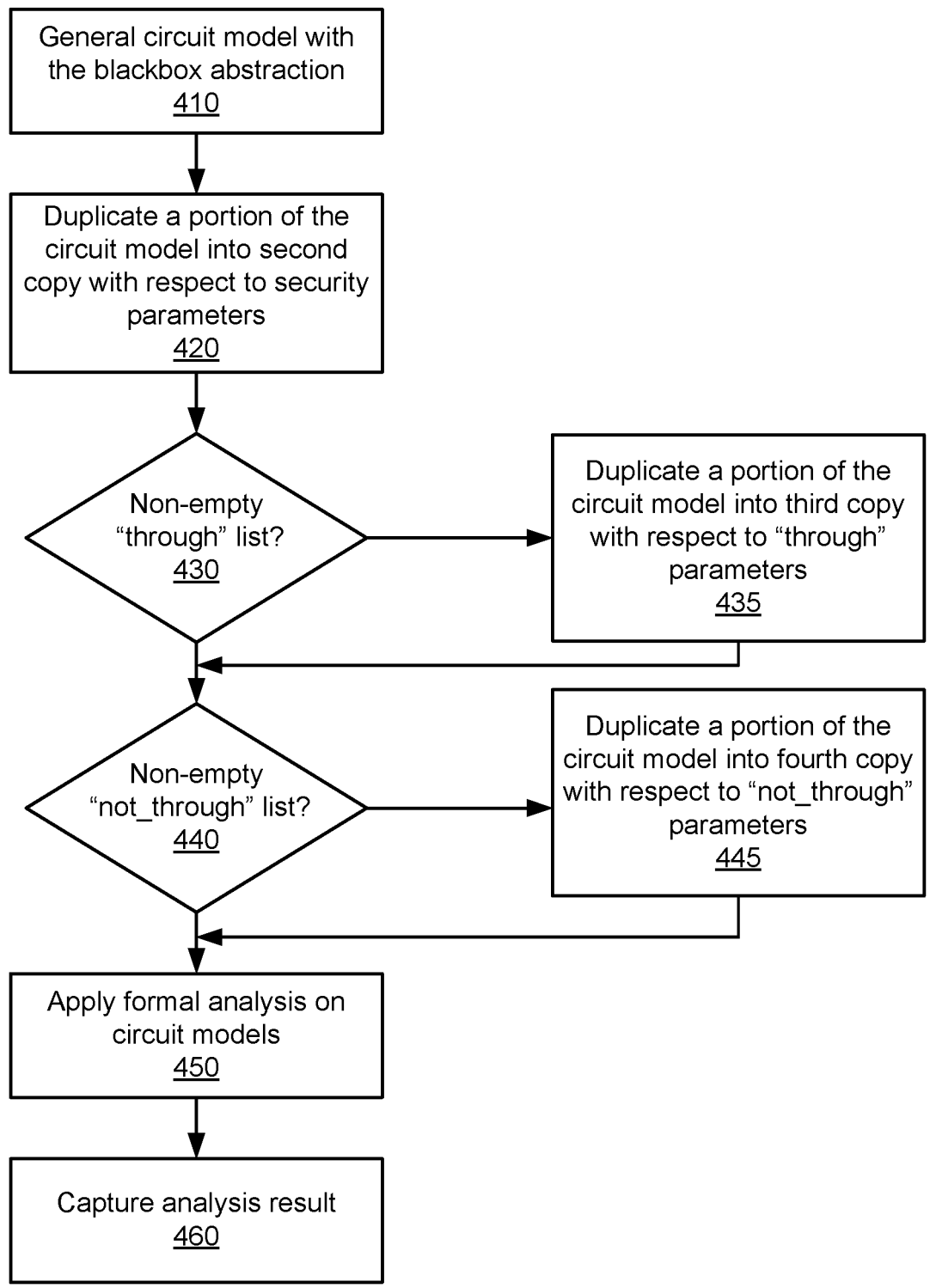
FIG. 4 illustrates a flowchart of a method to perform the verification step of a security property in accordance with an embodiment.

FIG. 4 illustrates a flowchart of a method to perform the verification step of a security property in accordance with an embodiment, corresponding to the operation in step 350. In step 410, the security verification system 200 generates a circuit model, such as a netlist, based on the black box information received in step 330 to replace portions of the circuit design selected to be excluded from the security path verification. The circuit model can be generated with a connectivity abstraction to model all of the possible data propagation paths between inputs and outputs of the black box. By doing so, the security path verification system 200 considers all potential propagation paths through the excluded circuit portion, even though the excluded circuit portion is treated as a black box, which increases the speed of the security verification.

In one embodiment, the black box information includes a hardware block specification and propagation delay specification. The hardware block specification specifies the names of the inputs and outputs of the connectivity abstraction along with the respective bit width of each input and output. For example, Table 1 shows a hardware block specification of a FIFO having inputs named clk, rstN, din, push, pop, having bit widths of 1, 1, 32, 1, and 1, respectively. The FIFO described in Table 1 also has outputs named dout, empty, and full, having bit widths of 32, 1, and 1, respectively.

TABLE 1

| | FIFO | |
|---|---|---|
| Name | Name | Width |
| List of inputs | clk | 1 |
| | rstN | 1 |
| | din | 32 |
| | push | 1 |
| | pop | 1 |
| List of outputs | dout | 32 |
| | empty | 1 |
| | full | 1 |

For the propagation delay specification, each output may be associated with a list of delay specifications. Each delay specification establishes a relationship between the output and a list of inputs in terms of the propagation delay between the output and each of the associated inputs of the connectivity abstraction. In one example, the propagation delay specification may be formatted to include a list of output names and a list of propagation delay specifications. For each output name, the propagation delay specification includes a list of input names and the propagation delay between each input associated with output. For example, Table 2 shows a propagation delay specification for the FIFO described in Table 1.

TABLE 2

| | | List of propagation delay specs | |
|---|---|---|---|
| | Name | List of inputs | Delay |
| List of outputs | dout | din | 2:$ |
| | | push, pop | 1 |
| | full | push, pop | 0:1 |
| | empty | push, pop | 1:3 |

As shown in Table 2, the propagation delay may have the format "N:M", where N is an integer equal to zero or greater than zero that represents the minimum propagation. The maximum propagation delay is represented by M. If the maximum delay is finite, M is an integer greater than or equal to N. If there is no maximum delay (i.e. the maximum delay is infinite), M may be represented by "$" or other suitable alpha numeric character. The delay is measured in terms of clock cycles of the signal connected to the input "global_clock", on the generated netlist. The generated netlist will have the same inputs and outputs as the original hardware block, along with an input called "global_clock," which may be used to measure the propagation delay.

Using the received black box information, the security path verification system 200 may create a connectivity abstraction using a definition such as:
  % check_spv -abstract \
    -instance s4_io \
    -delay 0:$ \
    -ignore_inputs {clk rstN}
This definition provides a simple delay model, in which data at all inputs except the one listed in "-ignore_inputs" can be propagated to any output with delay 0:$. The argument to '-instance' specifies the instance where connectivity abstractions is desired to be created, the argument '-delay' instructs the security path verification system 200 to allow propagations taking 0 (combinational) to infinite clock cycles to occur, and the argument '-ignore_inputs' instruct the security path verification system 200 to ignore creating connectivity abstractions using the inputs 'clk' and 'rstN'. More details about the connectivity abstractions will be described in FIG. 5.

Step 420 modifies the circuit model to prepare for verifying a path cover property. To capture the concept of tainted data in the model, two copies of the circuit model, L and R are created. L is the "master" copy, and R is the X-injected copy of the design. The injection of X represents the tainted concept. The net n has tainted data if the value of the net in L is different from the value of the same net in R, denoted as L.n !=R.n. For the analysis of "cover -path -from A -event e -to D", the formal verification module 202 will perform the following analysis on the circuit model with L and R:
  1) extract the set of nets S1 as the intersection of the nets in the transitive fanout of the net A in L and the nets in the transitive fanin of the net D in L
  2) extract the set of nets S2 as the nets in L that do not belong to S1
  3) remove the net A in L from S1
At this point, S1 and S2 comprise only nets in L and are created based on A and D.
  4) for every net n in S2, configure the analysis to assume the corresponding net n in R always has the same value as the net n in L, i.e. R.n=L.n
  5) for every net n in S1, duplicate circuit logic for the net n in R as a function of R
  6) for every bit a in the bus A, configure the analysis to assume lhs(R.a)=(R.e)? a': rhs(R.a), where a' is a new free input added to the circuit model.
The notation lhs(A) and rhs(A) is defined as: Given a net A in the circuit model, it can be split into two nets lhs(A) and rhs(A) connected through a buffer (lhs( ) stands for left-hand-side and rhs( ) stands for right-hand-side). The notation R.e means evaluating the expression e on the circuit model R. The new free input a' is used to introduce the possibility to inject tainted data, allowing the formal verification algorithm to pick a value different than the one used for net a in L.
  7) run formal verification 450, using traditional algorithm such as model checking, to determine if L.D !=R.D is possible. If it is not possible, the path cover property cannot be satisfied. If it is possible, the algorithm can generate a trace showing how the 'tainted" data can be propagated to D. The trace would be based on how the circuit model L is exercised, with the tainted data marked accordingly when the corresponding data in circuit model R has a different value. Note that, due to item 4, many nets in the copy R are not relevant to the analysis and can be optimized away, so only part of the circuit model is duplicated in R.

If the "through" list is not empty 430, the circuit model and the formal analysis described in step 420 needs to be modified. In step 435, for the analysis with cover -path -from A -event e -through B -to D, in order to capture the concept of through, another copy M of circuit model will be created.
  1) similar to S1, extract the set of nets S3 as the intersection of the nets in the transitive fanout of B in L and the nets in the transitive fanin of D in L.
  2) similar to S2, extract the set of nets S4 as the nets in L that do not belong to S3
  3) remove the net B in L from S3
This copy M of circuit model is constructed so that the net n has "tainted data through B" if and only if L.n !=R.n && L.n !=M.n. At this point, S3 and S4 comprise only nets in L and are created based on B and D.
  4) for every net n in S4, configure the analysis to assume the corresponding net n in M always has the same value as the net n in L, i.e. M.n=L.n
  5) for every net n in S4, duplicate circuit logic for the net n in M as a function of M
  6) for every bit b in the bus B, configure the analysis to assume "lhs(M.b)=R.b"
  7) run formal verification 450, using traditional algorithm such as model checking, to determine if (L.D !=R.D) && (L.D !=M.D) is possible. If it is not possible, the path cover property with -through cannot be satisfied.
Another embodiment of the algorithm in configuring the copy M of the circuit model may use a different encoding of "tainted data through B", such as L.n !=R.n && M.n=1, resulting in different formulations of the circuit model in 6 and 7, with a different complexity and preciseness of the analysis. If the "not_through" list is not empty 440, the circuit model and the formal analysis described in step 420 needs to be modified. In step 445, for the analysis for cover -path -from A -event e -not_through C -to D, the steps are similar to -through, except step 7 will run formal verification 450 to determine if (L.D !=R.D) && (L.D==M.D) is possible.

If both -through and -not_through are present, the analysis is modified to use another copy N of the circuit design, so that the copy M is configured for -through nets, and the copy N is configured for the -not_though nets. The formal verification algorithm will then analyze if (L.D !=R.D) && (L.D !=M.D) && (L.D==N.D) is possible.

In another embodiment, the security path verification system 200 may include an arbitrary number of_disjunctive_-through nets in an additional copy of the portion of the circuit design under test. In turn, the security path verification system 200 will analyze a path that goes through at least one of the -through nets. Conversely, the security path verification system 200 may include an arbitrary number of_conjunctive_-not_through nets in the one extra copy. In turn, the security path verification system 200 will analyze a path that does not go through any of the -not_through nets. In a further embodiment, when using conjunctive -through nets or disjunctive -not_through nets, then extra copies of the portion of the circuit design under test may be used for each conjunct/disjunct.

When there are conjunctive collections of disjunctions of -through nets, the security path verification system 200 creates extra copies M1, M2, etc. and considers only the path going through at least one of the -through nets by using the expression (L.D !=R.D) && ((L.D !=M1.D)||(L.D !=M2.D)|| . . . ) when running 450 formal verification. Similarly when there are disjunctive collections of conjunctions of -not_through, the security path verification system 200 creates extra copies M1, M2, etc. and considers only the path going through none of the -not_through nets by using expression (L.D !=R.D) && ((L.D==M1.D) && L.D==M2.D && . . . ) when running 450 formal verification.

In one embodiment, the security path verification system 200 may combine multiple -through nets differently, regarding them as an order list so that the security path verification system 200 checks if it is possible for the tainted data to go through the -through nets in the order they are specified. In this example, the analysis may modified accordingly to use lhs(M2.B2)=M1.B1, etc.

Figure 5A:
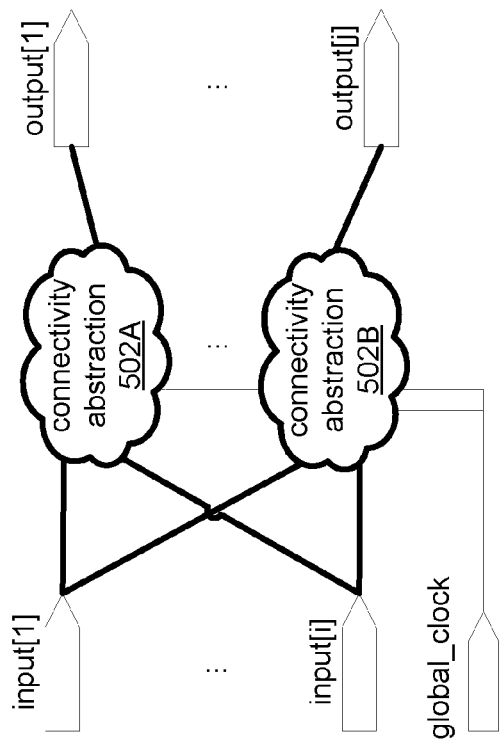
FIG. 5A illustrates a model of a connectivity abstraction in accordance with an embodiment.

FIG. 5A illustrates a model of a connectivity abstraction in accordance with an embodiment. As previously described in reference to FIGS. 3 and 4, each output of the black box is connected to a single connectivity abstraction. For example, FIG. 5A shows a black box of a portion of the circuit design under test having outputs [1]-[j], inputs [1]-[i] and global_clock, where j and i are integers. Connectivity abstraction 502A connects the inputs [1]-[i] to output [1]. Similarly, connectivity abstraction 502B connects the inputs [1]-[i] to output [j]. This configuration allows a signal present on any of the inputs [1]-[i] to be propagated to any output [1]-[j]. Moreover, because each propagation specification of each connectivity abstraction may be unique, the connectivity abstraction can account for the particular propagation behavior of between any input [1]-[j] and a corresponding output.

Figure 5B:
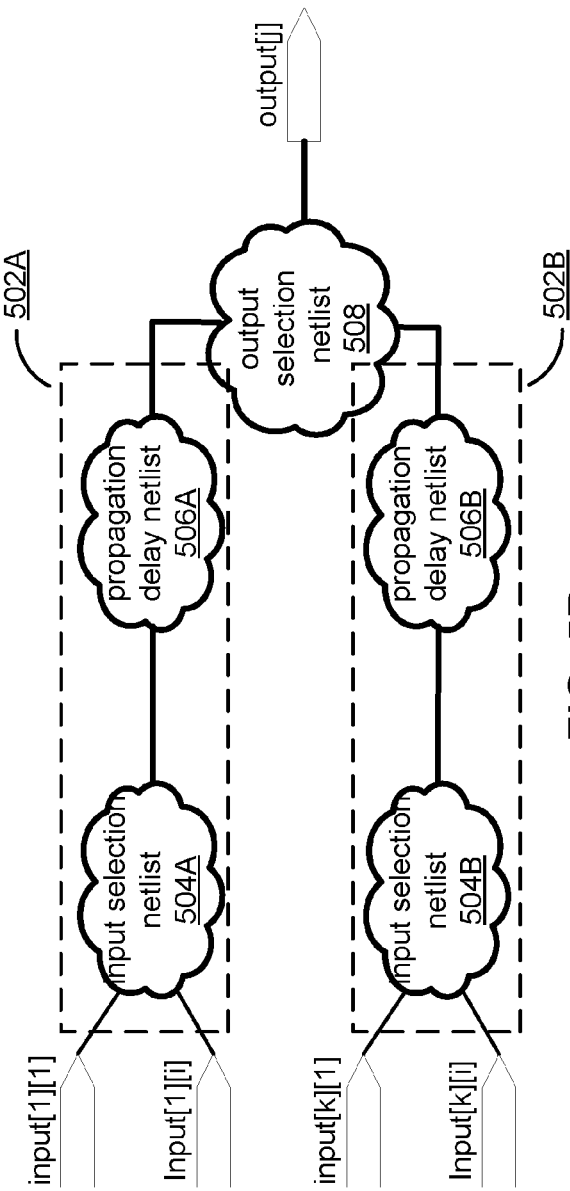
FIG. 5B illustrates a model of a connectivity abstraction in further detail in accordance with an embodiment.
Figure 6A:
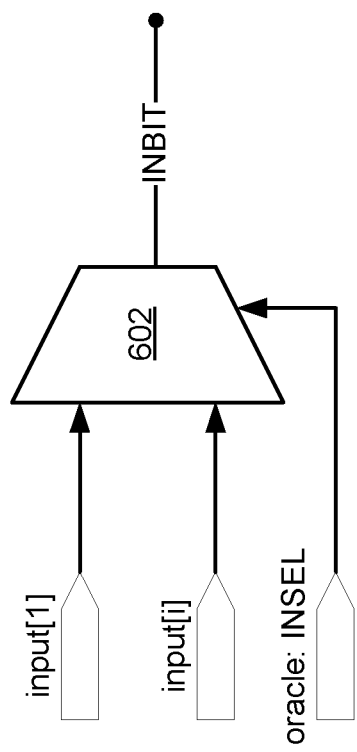
FIG. 6A illustrates a logic representation of an input selection netlist included in the connectivity abstraction in accordance with an embodiment.

FIG. 5B illustrates a model of a connectivity abstraction in further detail in accordance with an embodiment. The connectivity abstraction may be functionally divided into an input selection netlist 504, a propagation delay netlist 506, and an output selection and transformation netlist 508. The input selection netlists 504A and 504B may be represented logically as multiplexers as shown in FIG. 6A. The multiplexer 602 in FIG. 6A selects from one of inputs input[1]-[j] based on the control signal oracle:INSEL, and outputs the selected signal to output INBIT. The concept of oracle in formal verification terminology means the formal analysis is free to find specific values at difficult cycles for this signal in order to exercise the design to exhibit a target, which in this case, is the scenario exemplifying a security hole in the design.

Figure 6B:
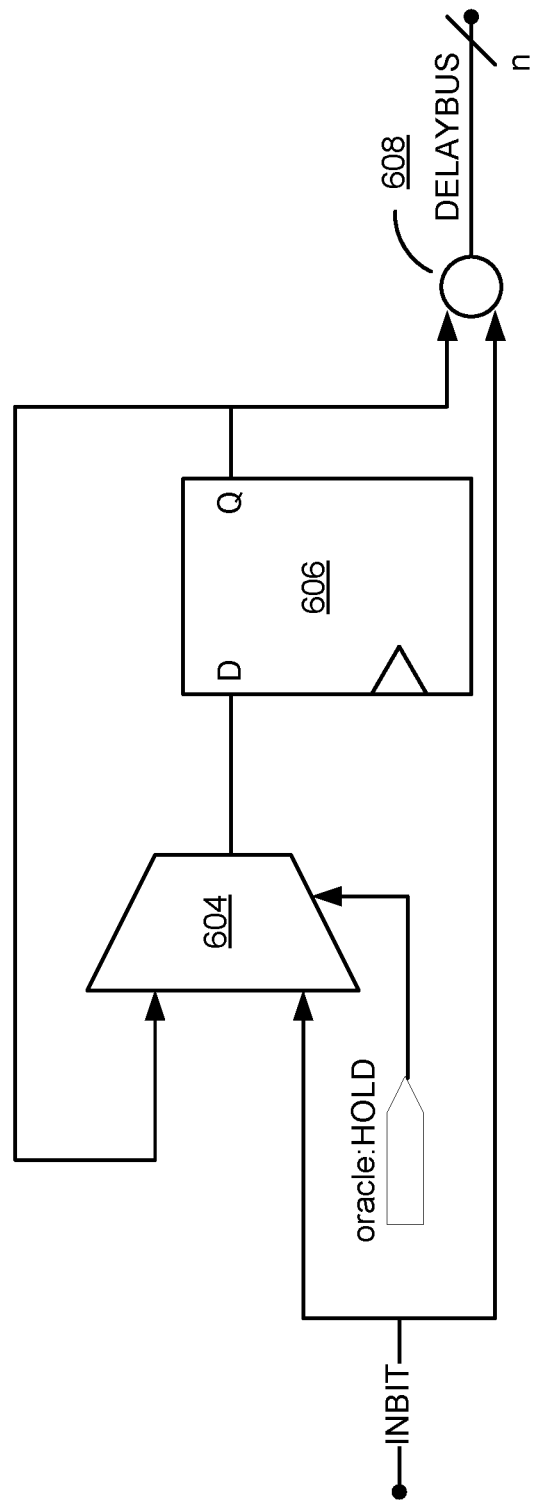
FIG. 6B illustrates a logic representation of a propagation delay netlist included in the connectivity abstraction in accordance with an embodiment.

The propagation delay netlists 506A and 506B are coupled to receive the output of the corresponding input selection netlists 504A and 504B. For example, the input of the propagation delay netlist 506A is coupled to receive the output of input selection netlist 504A. Similarly, the input of the propagation delay netlist 506B is coupled to receive the output of the input selection netlist 504B. The propagation delay netlist 506A or 506B may be represented logically as shown in FIG. 6B. The format of this netlist depends on the propagation delay specified for the target output and the list of inputs. The output of this netlist is a bus "DELAYBUS" which is connected to the output selection and transformation netlist 508. In cases where the minimum propagation delay is 0 and the maximum propagation delay is infinite, expressed as "0:$" delay, "INBIT" is output directly on "DELAYBUS", together with the output of a flip-flop 606. The flip-flop 606 can either hold its current value or sample the value of "INBIT", depending on the oracle "HOLD," which operates as the input selection control signal for multiplexer 604. In cases where the minimum propagation delay is greater than 0 and the maximum propagation delay is infinite, expressed as "N:$" delay (N>0), this netlist outputs a single bit on "DELAYBUS". To enforce the minimum delay of N cycles, a string of flip-flops may generated and placed before the last flip-flop 606. In cases where the both the minimum and maximum propagation delays are both finite and greater than 0, a stream of M flip-flops will be created and connected between an input of the multiplexer 604 and the input signal INBIT. The output of the last M-N+1 flip-flops will be connected to "DELAYBUS." The "DELAYBUS" signal is formed from all of the outputs of the propagation delay netlists.

Figure 6C:
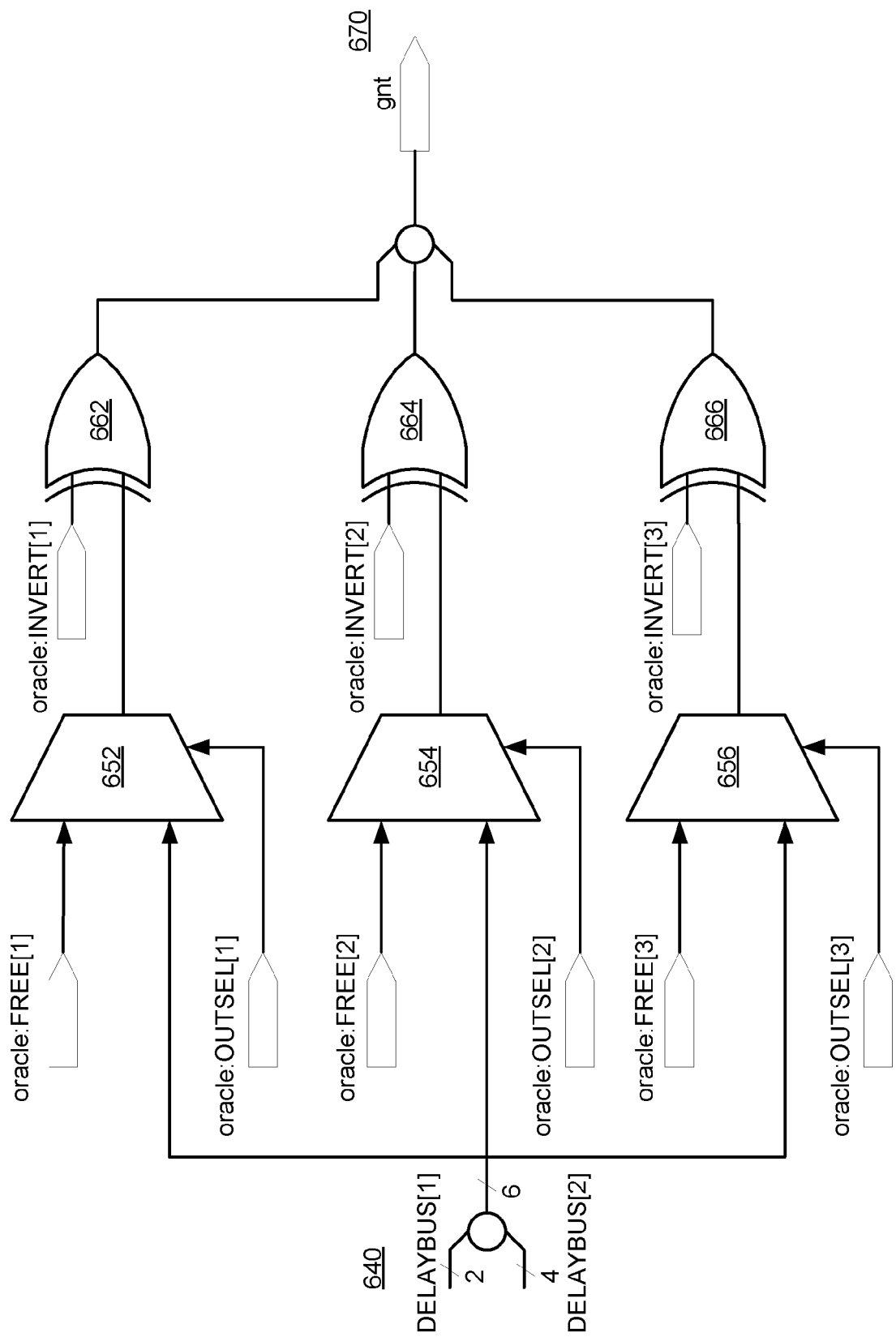
FIG. 6C illustrates a logic representation of an output selection and transformation netlist included in the connectivity abstraction in accordance with an embodiment The figures depict various embodiments of the present disclosure for purposes of illustration only. One skilled in the art will readily recognize from the following discussion that alternative embodiments of the structures and methods illustrated herein may be employed without departing from the principles of the embodiments described herein.

The output selection and transformation netlist 508 may be represented logically as shown in FIG. 6C. For each output bit, there will be circuit to arbitrarily select one bit from "DELAYBUSALL" 652, 654, 656 or from an oracle "FREE[i]" and to arbitrarily invert this bit, with the oracle "INVERT[i]" 662, 664, 666. All bits are then merged and connected to the output signal 670.

SUMMARY

The foregoing description of the disclosed embodiments has been presented for the purpose of illustration; it is not intended to be exhaustive or to limit the present disclosure to the precise forms disclosed. Persons skilled in the relevant art can appreciate that many modifications and variations are possible in light of the above disclosure.

Some portions of this description describe the disclosed embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium comprising computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer implemented method for security verification of an electronic circuit, the method comprising:
   accessing a first set of parameters identifying a first location within the electronic circuit that is a source of tainted data and a second location within the electronic circuit that is coupled to the first location;
   accessing a second set of parameters identifying a third location within the electronic circuit; and
   verifying whether the tainted data can reach the second location within the electronic circuit from the first location within the electronic circuit by propagating through the third location within the electronic circuit.

2. The method of claim 1, wherein the tainted data comprises unsecured, data or control information, generated at the first location and that appears as data or control information arriving at the second location.

3. The method of claim 1, wherein the tainted data comprises secured, data or control information, generated at the first location and that appears as data or control information arriving at the second location.

4. The method of claim 1, further comprising using formal verification in verifying whether the tainted data can reach the second location from the first location by propagating through the third location.

5. The method of claim 4, further comprising:
accessing a first circuit model of the electronic circuit;
generating a second circuit model of the electronic circuit by at least partially duplicating the first circuit model one or more times; and
verifying, using the second circuit model, whether the tainted data can reach the second location within the electronic circuit from the first location within the electronic circuit.

6. A non-transitory computer-readable storage medium having stored thereupon computer program code that, when executed by a micro-processor, causes the microprocessor of a computing system to perform a set of acts for security verification of an electronic circuit, the set of acts comprising:
accessing a first set of parameters identifying a first location within the electronic circuit that is a source of tainted data and a second location within the electronic circuit that is coupled to the first location;
accessing a second set of parameters identifying a third location within the electronic circuit; and
verifying whether the tainted data can reach the second location within the electronic circuit from the first location within the electronic circuit by propagating through the third location within the electronic circuit.

7. The non-transitory computer-readable storage medium of claim 6, wherein the tainted data comprises unsecured, data or control information, generated at the first location and that appears as data or control information arriving at the second location.

8. The non-transitory computer-readable storage medium of claim 6, wherein the tainted data comprises secured, data or control information, generated at the first location and that appears as data or control information arriving at the second location.

9. The non-transitory computer-readable storage medium of claim 6, wherein the set of acts further comprises using formal verification in verifying whether the tainted data can reach the second location from the first location by propagating through the third location.

10. The non-transitory computer-readable storage medium of claim 9, wherein the set of acts further comprising:

accessing a first circuit model of the electronic circuit;
generating a second circuit model of the electronic circuit by at least partially duplicating the first circuit model one or more times; and
verifying, using the second circuit model, whether the tainted data can reach the second location within the electronic circuit from the first location within the electronic circuit.

11. An apparatus for security verification of a circuit design, comprising:
one or more modules, at least one of which comprises at least one microprocessor including one or more processor cores executing one or more threads in a computing system;
a non-transitory computer accessible storage medium storing thereupon program code that includes a sequence of instructions that, when executed by the at least one micro-processor or processor core of a computing system, causes the at least one micro-processor or processor core at least to:
access a first set of parameters identifying a first location within the electronic circuit that is a source of tainted data and a second location within the electronic circuit that is coupled to the first location;
access a second set of parameters identifying a third location within the electronic circuit; and
verify whether the tainted data can reach the second location within the electronic circuit from the first location within the electronic circuit by propagating through the third location within the electronic circuit.

12. The apparatus of claim 11, wherein the tainted data comprises unsecured, data or control information, generated at the first location and that appears as data or control information arriving at the second location.

13. The apparatus of claim 11, wherein the tainted data comprises secured, data or control information, generated at the first location and that appears as data or control information arriving at the second location.

14. The apparatus of claim 11, wherein the program code further includes the sequence of instructions that, when executed by the at least one micro-processor or processor core of the computing system, further causes the at least one micro-processor or processor core to use formal verification in verifying whether the trained data can reach the second location from the first location.

15. The apparatus of claim 14, wherein the program code further includes the sequence of instructions that, when executed by the at least one micro-processor or processor core of the computing system, further causes the at least one micro-processor or processor core to:
access a first circuit model of the electronic circuit;
generate a second circuit model of the electronic circuit by at least partially duplicating the first circuit model one or more times; and
verify, using the second circuit model, whether the tainted data can reach the second location within the electronic circuit from the first location within the electronic circuit.

* * * * *